(12) United States Patent
Lamping (10) Patent No.: US 7,469,246 B1
(45) Date of Patent: Dec. 23, 2008

(54) METHOD AND SYSTEM FOR CLASSIFYING OR CLUSTERING ONE ITEM INTO MULTIPLE CATEGORIES

(75) Inventor: John Lamping, Los Altos, CA (US)

(73) Assignee: Stratify, Inc., Mountain View, CA (US)

(*) Notice: Subject to any disclaimer, the term of this patent is extended or adjusted under 35 U.S.C. 154(b) by 278 days.

(21) Appl. No.: 09/860,646

(22) Filed: May 18, 2001

(51) Int. Cl.
G06F 17/30 (2006.01)

(52) U.S. Cl. .............................. 707/6; 707/7

(58) Field of Classification Search ............. 707/1, 707/3–6, 10, 100, 102, 104.1; 382/168, 181, 382/224–229, 236–240, 170; 704/200, 236–240
See application file for complete search history.

(56) References Cited

U.S. PATENT DOCUMENTS

| | | | |
|---|---|---|---|
| 5,703,964 A * | 12/1997 | Menon et al. ............. | 382/228 |
| 5,787,394 A * | 7/1998 | Bahl et al. ............. | 704/238 |
| 5,787,422 A | 7/1998 | Tukey et al. | |
| 5,832,182 A | 11/1998 | Zhang et al. | |
| 5,864,855 A | 1/1999 | Ruocco et al. | |
| 5,895,470 A | 4/1999 | Pirolli et al. | |
| 5,999,927 A | 12/1999 | Tukey et al. | |
| 6,003,029 A | 12/1999 | Agrawal et al. | |
| 6,055,540 A | 4/2000 | Snow et al. | |
| 6,151,697 A * | 11/2000 | Moeller ............. | 714/759 |
| 6,154,213 A | 11/2000 | Rennison et al. | |
| 6,182,066 B1 | 1/2001 | Marques | |
| 6,216,134 B1 | 4/2001 | Heckerman et al. | |
| 6,263,337 B1 | 7/2001 | Fayyad et al. | |
| 6,360,224 B1 * | 3/2002 | Chickering ............. | 707/100 |
| 6,446,061 B1 * | 9/2002 | Doerre et al. ............. | 707/3 |
| 6,513,027 B1 | 1/2003 | Powers et al. | |
| 6,523,026 B1 * | 2/2003 | Gillis ............. | 707/3 |
| 6,581,058 B1 | 6/2003 | Fayyad et al. | |
| 6,629,097 B1 | 9/2003 | Keith | |

(Continued)

OTHER PUBLICATIONS

Fraley et al. "How may Clusters? Which Clustering Method? Answers Via Model-Based Cluster Analysis", The Computer Journal, vol. 41, No. 8 (1998) pp. 578-588.

(Continued)

*Primary Examiner*—Debbie Le
(74) *Attorney, Agent, or Firm*—Townsend and Townsend and Crew LLP (57) ABSTRACT

A method (and system) for associating an item with only less than ten categories from a collection of more than hundred categories. Each category includes a model, which determines a process. The process determines a degree of closeness to a set of features of items. The method includes receiving an item (e.g., document); and determining a set of features (e.g., word, number, author) associated with the item. The method also uses the set of features with two or more processes in respective categories out of the collection of more than one hundred categories to determine how well the set of features matches the two or more categories. A step of forming a blended model from two or more categories to derive a blended process is included. The blended process yields a closer fit to the set of features of the item than that of any single process of a category from the collection of categories. The method associates the item to each of the two or more categories that were used to form the blended process.

20 Claims, 4 Drawing Sheets

U.S. PATENT DOCUMENTS

| | | | |
|---|---|---|---|
| 6,633,882 | B1 | 10/2003 | Fayyad et al. |
| 6,671,818 | B1 * | 12/2003 | Mikurak ........................ 714/4 |
| 6,678,671 | B1 * | 1/2004 | Petrovic et al. ................ 707/1 |
| 6,766,355 | B2 | 7/2004 | Liang et al. |
| 6,778,995 | B1 | 8/2004 | Gallivan et al. |
| 6,792,545 | B2 | 9/2004 | McCreight et al. |
| 6,820,081 | B1 | 11/2004 | Kawai et al. |
| 6,829,713 | B2 * | 12/2004 | Cooper et al. ............... 713/320 |
| 6,839,680 | B1 | 1/2005 | Liu et al. |
| 6,888,548 | B1 | 5/2005 | Gallivan |
| 6,892,193 | B2 * | 5/2005 | Bolle et al. .................... 706/20 |
| 6,978,274 | B1 | 12/2005 | Gallivan et al. |
| 6,993,535 | B2 * | 1/2006 | Bolle et al. ............... 707/104.1 |
| 7,035,876 | B2 | 4/2006 | Kawai et al. |
| 7,107,266 | B1 * | 9/2006 | Breyman et al. ............... 707/6 |
| 7,191,175 | B2 | 3/2007 | Evans |
| 7,271,804 | B2 | 9/2007 | Evans |
| 2001/0039544 | A1 | 11/2001 | Chakrabarti et al. |

OTHER PUBLICATIONS

Fraley "Algorithms for Model-Based Gaussian Hierarchical Clustering" Siam J. Sci. Comput. vol. 20, No. 1 (1998) pp. 270-281.

Iwayama et al. "Hierarchical Bayesian Clustering for Automatic Text Classification", Proceedings of the Fourteenth Intl. Joint Conference on Artificial Intelligence, vol. 2 (Aug. 1995) pp. 1322-1327.

Willett, "Document Clustering Using and Inverted File Approach", Journal of Information Science 2 (1980) pp. 223-231.

Jane and Dubes, "Clustering Methods and Algorithms", Prentice Hall (1988) QA 278, J341, Chapter 3, pp. 55-142.

Fraley et al., "How Many Clusters? Which Clustering Methyod? Answers Via Model-Based Cluster Analysis", The Computer Journal, vol. 41, No. 8, 1988, pp. 578-588.

Fraley, "Algorithms For Model-Based Gaussian Hierarchical Clustering", Siam J. Sci. Comput., vol. 20, No. 1, pp. 270-281.

Iwayama et al., "Hierarchical Bayesian Clustering for Automatic Text Classification", Proceedings of the Fourteenth Intl. Joint Conference on Artificial Intelligence, vol. 2, Aug. 1995, pp. 1322-1327.

Willett, "Document Clustering Using an Inverted File Approach", Journal of Information Science 2 (1980), pp. 223-231.

"Jane and Dubes, Algorithms for Clustering Data", Prentice Hall, 1998, QA 278, J341, Chapter 3, pp. 55-142.

* cited by examiner

METHOD AND SYSTEM FOR CLASSIFYING OR CLUSTERING ONE ITEM INTO MULTIPLE CATEGORIES

BACKGROUND OF THE INVENTION

The present invention relates generally to classifying information. More particularly, the invention provides a method and system for automatic classification or clustering, such as automatic classification or clustering of documents. In one aspect, the present invention provides a way of classification that is to correctly associate items (e.g., documents) to be classified with one or more appropriate pre-defined categories, which define the items. Clustering can be used to group items into clusters, which serve as categories.

In the early days, ancient people scribed markings that served as information onto natural objects such as stone and wood. That is, cave people cut markings of trees, people, and wild animals onto sides of cave walls. These caves with markings have stood in place for thousands of years to preserve a piece of history by way of the markings. Unfortunately, it was difficult to make scribes on cave walls, which were extremely hard and prone to damage. It was also impossible to transport such walls, which were fixed. Accordingly, people began to scribe markings on wild animal skins after they were removed and cured. The skins were easily transportable and also much easier to scribe than hard cave walls. Wild animals, however, became scarce and often difficult to find and hunt down due increasing populations of people that tended to reduce the wild animal population. Additionally, the skins often became damaged and rancid when subject to wetness from rain and snow.

Thin sheets of wood eventually served as a medium for markings. The wood became thinner and eventually "paper" was discovered. Wood pulp which was bound together formed conventional paper and paper products. Paper was used to preserve large amounts of written information. Paper was often bundled and bound in the form of books. Books were easily transportable and also easy to read. Thereafter, computers were used to form and store information in the form of electronic files. Such files were easily stored in a hard disk media. People began connecting these computers together in the form of a network and then began sending information from one computer to another in the form of electronic files. The networks were first local to a specific office or region. Then, the networks grew and eventually connected computers all over the world. A commonly known network for connecting such computers in a world wide manner is the Internet.

Now that millions of people have computers, which are connected to other computers over the Internet, there has been an explosion of information which could be accessed at a touch of a button. With the explosion of such information, people began categorizing documents into categories. Such categories were frequently used in classification and also used in clustering. As merely an example, U.S. Pat. Nos. 5,787,422 and 5,999,927, in the name of Tukey, et al. (herein "Tukey"), describe techniques for defining such categories in a conventional manner. The conventional technique, however, only placed an item into a single category. The conventional technique also placed a number of items into the best fitting and second best fitting clusters. Other conventional techniques placed a single item into many categories, which tends to overly dilute the value of classification for users.

Such conventional techniques often result in failing to recognize a significant fraction of the content of the item or resulted in failing to provide meaningful information due to combinatorial explosion. Additional details of such failings are described in more detail below. Such details were discovered by the present inventor. Other related art includes the following: Fraley, C. and A. E. Raftery, *How many clusters? Which clustering method? Answers via model-based cluster analysis*, Computer Journal, 41, 578-588, 1998; M. Iwayama and T. Tokunaga, *Hierarchical bayesian clustering for automatic text classification*, In Proceedings of the International Joint Conference on Artificial Intelligence, 1995; C. Fraley. *Algorithms for model-based Gaussian hierarchical clustering*, SIAM Journal on Scientific Computing, 20:270-281, 1999; Jane & Dubes, Algorithms for Clustering Data, Prentice Hall, 1988 P. Willett, *Document Clustering Using an Inverted File Approach*, Journal of Information Science, Vol. 2 (1980), pp. 223-31; Hofmann, T. and Puzicha, J., *Statistical models for cooccurrence data*. AI-MEMO 1625, Artificial Intelligence Laboratory, Massachusetts Institute of Technology (1998); U.S. Pat. No. 5,832,182, Zhang, et al. Method and system for data clustering for very large databases; U.S. Pat. No. 5,864,855, Ruocco, et al. Parallel document clustering process; U.S. Pat. No. 5,857,179, Vaithyanathan, et al., Method and apparatus for information access employing overlapping clusters; U.S. Pat. No. 6,003,029 Agrawal, et al., among others.

From the above, it is seen that an improved way for organizing information is highly desirable.

SUMMARY OF THE INVENTION

According to the present invention, a technique including a method and system for classifying information is included. More particularly, the invention provides a method and system for automatic classification or clustering, such as automatic classification or clustering of documents. In one aspect, the present invention provides a way of classification that is to correctly associate items (e.g., documents) to be classified with one or more appropriate pre-defined categories, which define the items. Clustering can be used to group items into clusters, which serve as categories.

In a specific embodiment, the invention provides a method for associating an item with only less than ten categories from a collection of more than hundred categories. Each category includes a model, which determines a process. The process determines a degree of closeness to a set of features of items. The method includes receiving an item (e.g., document); and determining a set of features (e.g., word, number, author) associated with the item. The method also uses the set of features with two or more processes in respective categories out of the collection of more than one hundred categories to determine how well the set of features matches the two or more categories. A step of forming a blended model from two or more categories to derive a blended process is included. The blended process yields a closer fit to the set of features of the item than that of any single process of a category from the collection of categories. The method associates the item to each of the two or more categories that were used to form the blended process.

In an alternative embodiment, the invention provides a system for associating an item with only less than ten categories from a collection of more than hundred categories. Each category includes a model, which determines a selected process. The selected process determines a degree of closeness to a set of features of items. The system has computer memory or memories that are distributed. The memory or memories has novel computer codes for carrying out the functionality described herein as well as outside this specification. The codes are implemented in software but can also be hardware or a combination of hardware and software, which has a first code directed to receive electronic information associated with an item. The memory has a second code directed to determine a set of features associated with the information from the item. The memory also has a third code directed to use the set of features with two or more processes in respective categories out of the collection of more than one hundred categories to determine how well the set of features matches the two or more categories. A fourth code is included to form a blended model from two or more categories to derive a blended process such that the blended process yields a closer fit to the set of features of the information of the item than that of any single process of a category from the collection of categories. The memory also has a fifth code directed to associate the item to each of the two or more categories that were used to form the blended process. Depending upon the embodiment, there may be one or more of these codes, as well as other codes for carrying out the functionality described herein.

According to the present invention, there may be individual items that should be placed in more than one category. For example, an article about an earthquake in Japan should be placed both in a category for "earthquakes" and in a category for "Japan." In many aspects, as in this example, the article should be placed in both categories, not because it is ambiguous or uncertain which category the article belongs in, but because the article contains some content related to one category, and some content related to the other. By placing the article in both categories, we can determine with higher accuracy the actual meaning and content of the article.

Returning to the article about the earthquake in Japan, there might be several categories corresponding to earthquakes, one about the destruction caused by earthquakes, and one about the geophysics of earthquakes. If the article is primarily about the earthquake and less about Japan, it might be more similar to each earthquake category than to the Japan category. Tukey's approach would place the article in the two earthquake categories, rather than in category about the destruction caused by earthquakes and the category about Japan. If the classification were used to present articles to users, based on their interest, users interested in Japan would not be presented with the article. This problem is particularly severe for automatic clustering, as there will frequently be groups of similar clusters, and placing an item in the individually best clusters will just put it into each cluster in the group, rather than in clusters that cover the content of the item.

The present invention addresses limitations of conventional techniques by providing that items should be placed in several categories because they contain some content related to each category. Rather than place the item in the individually best fitting few categories as the conventional techniques, the present method places the item in more than two or few categories that collectively best account for the content of the item. Using for example the article about the earthquake in Japan, a combination of the category of Japan and the category of destruction caused by earthquakes is likely to better account for the contents of the article than a combination of the two categories about earthquakes. That is, the present method treats the content item as a mixture of several categories, and places the item in the categories whose mixture best describes the content of the item. Mixture models are well known in conventional techniques, but most treat the collection of items to be classified or clustered as a mixture of items from different categories, each item coming from a single category. These conventional techniques do not envision the content of an individual item as coming from several categories. Hofmann and Puzicha describe a technique for treating individual documents as a mixture of many categories, but do not present a method for efficiently dealing with large number of possible categories.

The invention can be used to improve clustering and classification in another way. In classification based on statistical learning, the algorithm is presented with a training set of items for each category. It uses those items to build a model of the category, which is then used to classify other items. When a training item contains content belonging to several categories, the model for the intended category will also reflect content belonging to other categories. For example, if the article about the earthquake in Japan is used in the training set for a category on Japan, the model for Japan will tend to reflect the content on earthquakes. As a result, an article about an earthquake in another part of the world may be incorrectly categorized as being about Japan. A similar problem arises in clustering, if the article is associated with a cluster about Japan.

The present invention addresses this problem by exploiting multiple classifications to separate the content of a document into parts, one part for each category the item is associated with. The algorithm assigns each piece of content to the parts in proportion to how well the category for that part explains the piece of content. Thus, in the case of the example article, content about earthquakes will be mostly assigned to the part for the earthquake category, and content about Japan will be mostly assigned to the part for the Japan category. Then, when the model for the categories is constructed, the model for each category only reflects the part of the content of the item assigned to that category.

In a preferred embodiment, the invention provides a way to categorize an item into a few well defined categories, where the categories are one of a plurality of categories such as hundreds or perhaps thousands of categories. The invention provides a way of categorizing without combinatorial explosion, which often occurs using conventional techniques. These and other advantages of the present invention are defined throughout the present specification and more particularly below.

The foregoing, together with other features, embodiments, and advantages of the present invention, will become more apparent when referring to the following specification, claims, and accompanying drawings.

DESCRIPTION OF THE SPECIFIC EMBODIMENTS

The present invention relates generally to classifying information. More particularly, the invention provides a method and system for automatic classification or clustering, such as automatic classification or clustering of documents. In one aspect, the present invention provides a way of classification that is to correctly associate items (e.g., documents) to be classified with one or more appropriate pre-defined categories, which characterize items that should belong to them. Clustering can be used to group items into clusters, which serve as categories.

To better understand the present invention, it may be useful to define the following terms. These terms are not intended to be limiting the scope of the claims herein. They are merely provided to be illustrative, which should assist the reader in fully understanding the invention.

Clustering: This term is defined as grouping a set of objects (e.g., document, DNA sequence, purchase transaction, financial record, species description) into a set of groups (or groupings) such that the objects in a group tend to be more similar to each other than objects in another group. Other definitions for clustering include the following, which are not intended to be limiting.

"Clustering is a descriptive task associated with data mining that identifies homogeneous groups of objects in a data-set. Clustering techniques have been studied extensively in statistics, pattern recognition, and machine learning. Examples of clustering applications include customer segmentation for database marketing, identification of sub-categories of spectra from the database of infra-red sky measurements, and identification of areas of similar land use in an earth observation database. (Agrawal, et al. U.S. Pat. No. 6,003,029).

"Clustering techniques can be broadly classified into partitional techniques and hierarchical techniques. Partitional clustering partitions a set of objects into K clusters such that the objects in each cluster are more similar to each other than to objects in different clusters. For partitional clustering, the value of K can be specified by a user, and a clustering criterion must be adopted, such as a mean square error criterion, like that disclosed by P. H. Sneath et al., Numerical Taxonomy, Freeman, 1973. Popular K-means methods, such as the FastClust in SAS Manual, 1995, from the SAS Institute, iteratively determine K representatives that minimize the clustering criterion and assign each object to a cluster having its representative closest to the cluster. Enhancements to partitional clustering approach for working on large databases have been developed, such as CLARANS, as disclosed by R. T. Ng et al., Efficient and effective clustering methods for spatial data mining, Proc. of the VLDB Conference, Santiago, Chile, September 1994; Focussed CLARANS, as disclosed by M. Ester et al., A database interface for clustering in large spatial databases, Proc. of the 1st Int'l Conference on Knowledge Discovery in Databases and Data Mining, Montreal, Canada, August 1995; and BIRCH, as disclosed by T. Zhang et al., BIRCH: An efficient data clustering method for very large databases, Proc. of the ACM SIGMOD Conference on Management Data, Montreal, Canada, June 1996.

Hierarchical clustering is a nested sequence of partitions. An agglomerative, hierarchical clustering starts by placing each object in its own atomic cluster and then merges the atomic clusters into larger and larger clusters until all objects are in a single cluster. Divisive, hierarchical clustering reverses the process by starting with all objects in cluster and subdividing into smaller pieces. For theoretical and empirical comparisons of hierarchical clustering techniques, see for example, A. K. Jain et al., Algorithms for Clustering Data, Prentice Hall, 1988, P. Mangiameli et al., Comparison of some neutral network and hierarchical clustering methods, European Journal of Operational Research, 93(2):402-417, September 1996, P. Michaud, Four clustering techniques, FGCS Journal, Special Issue on Data Mining, 1997, and M. Zait et al., A Comparative study of clustering methods, FGCS Journal, Special Issue on Data Mining, 1997."

"In order to cluster documents, it is necessary to first establish a pair-wise measure of document similarity and then define a method for using that measure to form sets of similar documents, or clusters. Numerous document similarity measures have been proposed, all of which consider the degree of word overlap between the two documents of interest, described as sets of words, often with frequency information. These sets are typically represented as sparse vectors of length equal to the number of unique words (or types) in the corpus. If a word occurs in a document, its location in this vector is occupied by some positive value (one if only presence/absence information is considered, or some function of its frequency within that document if frequency is considered). If a word does not occur in a document, its location in this vector is occupied by zero. A popular similarity measure, the cosine measure, determines the cosine of the angle between two sparse vectors. If both document vectors are normalized to unit length, this is of course, simply the inner product of the two vectors. Other measures include the Dice and Jaccard coefficient, which are normalized word overlap counts. Words are often replaced by terms, in which gentle stemming has combined words differing only by simple suffixes, and words on a stop list are omitted." (Tukey, et al U.S. Pat. No. 5,787,422)

Categories: This term is defined by a topic (e.g., Japan, health, finance) including a set of features with related weighing factors that define the topic.

Item: This term is defined as a collection of related information such as a document, a profile (e.g., company, personal, purchase history), history information, financial information, art and literature, credit report, Web pages, technical and/or scientific papers, legal documents, patent documents (e.g., patents, patent applications).

Feature: This term is defined as an individual instance of information of an item. For example, an occurrence of a word or words in a document is a feature.

Model: This term is defined as a characterization (e.g., mathematical) of information of features of items in a category. Examples of models include centroid feature vectors and Naïve Bayes models.

As noted and further emphasized herein, one of ordinary skill in the art would also recognize other variations, modifications, and alternatives to the definitions defined above. The definitions defined above may also have some overlap and may also be a function of other definitions. They are not intended to be an independent set of items that are unassociated with each other, although they may be in a few instances, for example. Accordingly, they are not intended to be limiting in any manner to the scope of the claims herein. Further details of the present invention are found throughout the present specification and more particularly below.

Figure 1:
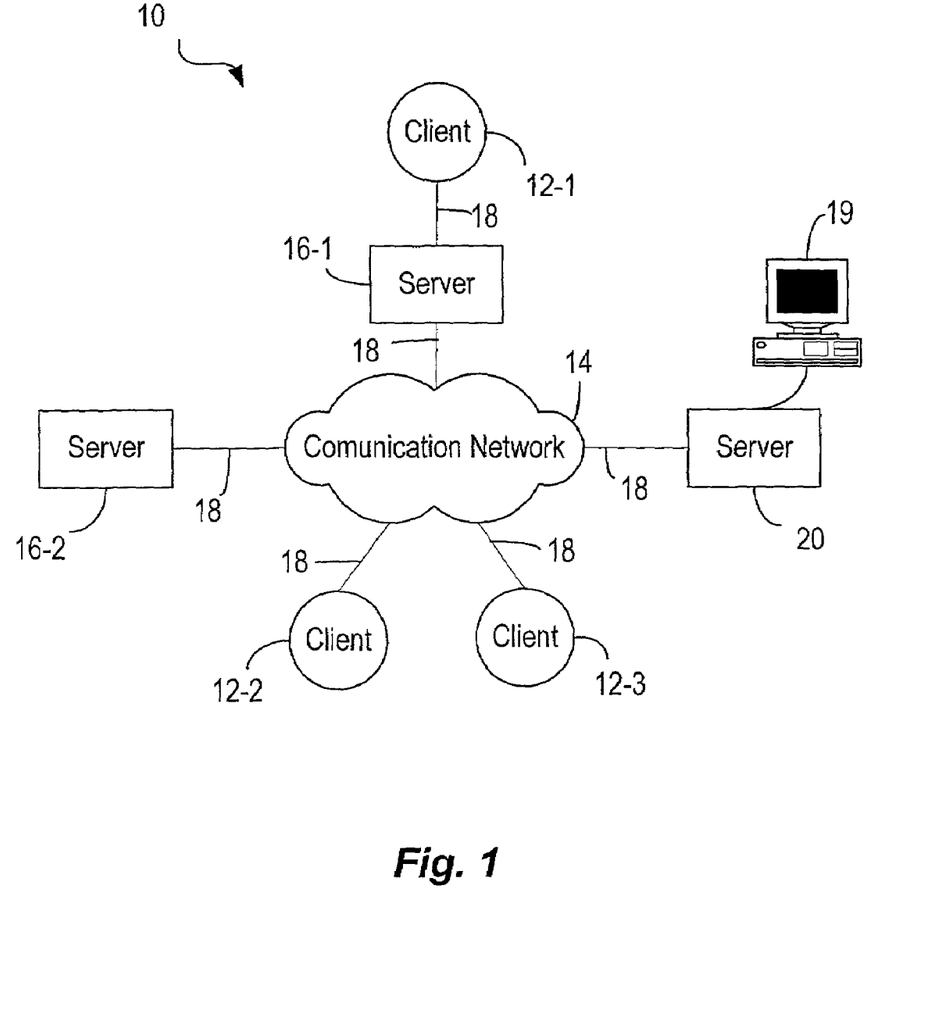
FIG. 1 is a simplified diagram of system hardware according to an embodiment of the present invention.

FIG. 1 is a simplified diagram of system hardware 10 according to an embodiment of the present invention. This diagram is merely an example which should not unduly limit the scope of the claims herein. One of ordinary skill in the art would recognize many other variations, modifications, and alternatives. As shown, computer network 10 includes a number of computer systems including client computer systems 12-1, 12-2, and 12-3, and web server systems 16-1 and 16-2, coupled to communication network 14 via communication links 18. Computer network 10 may also include a classifying server 20 coupled to communication network 14 via communication link 18. It should be apparent that a computer system in computer network 10 may function as a client system, a web server, an classifying server, or combinations thereof.

Communication network 14 provides a mechanism allowing the various components of computer network 10 to communicate and exchange information with each other. Communication network 14 may itself be comprised of many interconnected computer systems and communication links. Communication links 18 may be hardwire links, optical links, satellite or other wireless communications links, wave propagation links, or any other mechanisms for communication of information. While in one embodiment, communication network 14 is the Internet, in other embodiments, communication network 14 may be any suitable computer network. Distributed computer network 10 depicted in FIG. 1 is merely illustrative of an embodiment incorporating the present invention and does not limit the scope of the invention as recited in the claims. One of ordinary skill in the art would recognize other variations, modifications, and alternatives.

Client computers 12 allows users, both human and machine, to access web pages and other information resources stored by web servers 16 coupled to communication network 14. As shown in FIG. 1, client computer systems 12 may be coupled to the web servers via communication network 14, for example, client systems 12-2 and 12-3, or may alternatively be coupled directly to the server systems, for example, client system 12-1. As previously stated, a user may use a web browser executing on a client computer to access and view web pages and other information stored by web servers 16.

Web server systems 16 store information resources which may be accessed by users of the Internet. For example, web pages stored by web servers 16 may be accessed by users using client computers 12. As shown in FIG. 1, in a specific embodiment of the present invention, a classifying server 20 may facilitate the process of providing relevant information to the client while preserving the privacy of the user accessing the information. Further information related to the functions performed by a client, a web server, and the classifying server are explained below.

In a specific embodiment, the classifying server can perform a variety of classifying or clustering processes. Such processes can be performed over the network. Alternatively, such processes can be performed over a stand-alone machine 19, which is coupled to the server. In a specific embodiment, the server can implement a method for associating an item with only less than ten categories from a collection of more than one hundred categories. The method can be implemented using a combination of computer hardware and software. Each category includes a model, which determines a process. The process determines a degree of closeness to a set of features of items. The method includes receiving an item (e.g., document); and determining a set of features (e.g., word, number, author) associated with the item. The method also uses the set of features with two or more processes in respective categories out of the collection of more than one hundred categories to determine how well the set of features matches the two or more categories. A step of forming a blended model from two or more categories to derive a blended process is included. The blended process yields a closer fit to the set of features of the item than that of any single process of a category from the collection of categories. The method associates the item to each of the two or more categories that were used to form the blended process. Preferably, the number of categories in the blended process is less than ten or so. Further details of such method are provided below.

Additionally, the above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 2:
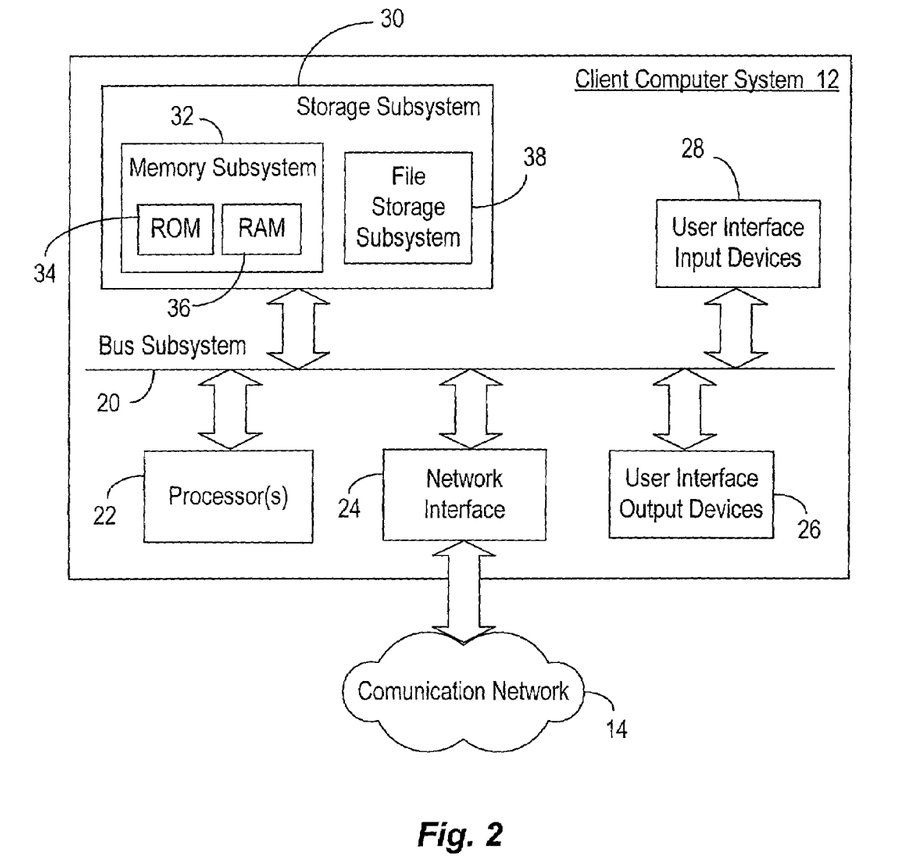
FIG. 2 is a simplified block diagram of a computer system which may be used in accordance with the present invention.

FIG. 2 is a simplified block diagram of a computer system 12 which may be used in accordance with the present invention. This diagram is merely an example which should not unduly limit the scope of the claims herein. One of ordinary skill in the art would recognize many other variations, modifications, and alternatives. Computer system 12 may function as a client system, a web server system, an classifying server system, or a combination of the aforementioned systems. Computer system 12 typically includes at least one processor 22 which communicates with a number of peripheral devices via bus subsystem 20. These peripheral devices may include a storage subsystem 30, comprising a memory subsystem 32 and a file storage subsystem 38, user interface input devices 28, user interface output devices 26, and a network interface subsystem 24. The input and output devices allow user interaction with computer system 12. Network interface subsystem 24 provides an interface to outside networks, including an interface to communication network 14, and is coupled via communication network 14 to corresponding interface devices in other client and server computer systems.

User interface input devices 28 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 21 or onto computer network 14.

User interface output devices 26 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 21 to the user or to another machine or computer system.

Storage subsystem 30 may be used to store the basic programming and data constructs that provide the functionality of the present invention. For example, the various modules implementing the functionality of the present invention and the browser application may be stored in storage subsystem 30. These software modules are generally executed by processor 23.

Memory subsystem 32 typically includes a number of memories including a main random access memory (RAM) 36 for storage of instructions and data during program execution and a read only memory (ROM) 34 in which fixed instructions are stored. File storage subsystem 38 provides persistent (non-volatile) storage for program and data files, and may include a hard disk drive, a floppy disk drive along with associated removable media, a Compact Digital read Only Memory (CD-ROM) drive, an optical drive, or removable media cartridges. The databases and modules implementing the functionality of the present invention may be stored by file storage subsystem 38.

Bus subsystem 20 provides a mechanism for letting the various components and subsystems of computer system 12 communicate with each other as intended. Although bus subsystem 20 is shown schematically as a single bus, alternate embodiments of the bus subsystem may utilize multiple busses.

Computer system 12 itself can be of varying types including a personal computer, a portable computer, a workstation, a computer terminal, a network computer, a television, a mainframe, or any other data processing system or user device. Due to the ever-changing nature of computers and networks, the description of computer system 12 depicted in FIG. 2 is intended only as a specific example for purposes of illustrating an embodiment of the present invention. Many other configurations of computer system are possible having more or less components than the computer system depicted in the FIG. As previously stated, computer system 12 may function as a client or server or both, although server computer systems typically have more storage capacity and computing power than client computer systems.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

A method according to the present invention can be described as follows:

1. Provide document;
2. Extract words from document;
3. Stem words;
4. Form features from the extracted words and stemmed words;
5. Find best matching model to feature vector, where the model is derived from a plurality of models in a library;
6. Compute estimated overlap;
7. Compute remainder feature vector;
8. Find best matching model to remainder feature vector;
9. Find best matching combination of two or more models to original feature vector;
10. If the contributions of the models are above a threshold, associate the document with two or more of the categories;
11. If the contributions of the models are below a threshold, associate the document with one category; and
12. Perform other steps, as desired.

These steps provide a way of processing a document, for example, for classifying and clustering purposes. By way of the processing steps, the method can classify the document and place it into a fixed number of categories, such as more than two but less than ten, for example. The processing steps rely upon a novel pruning technique for processing a remainder portion of the document, which allows for large volumes of documents to be categorized against more than one hundred (100) or more than one thousand (1000) different categories. Further details of the steps are provided throughout the present specification and more particularly by way of the Figs. below.

Figure 3:
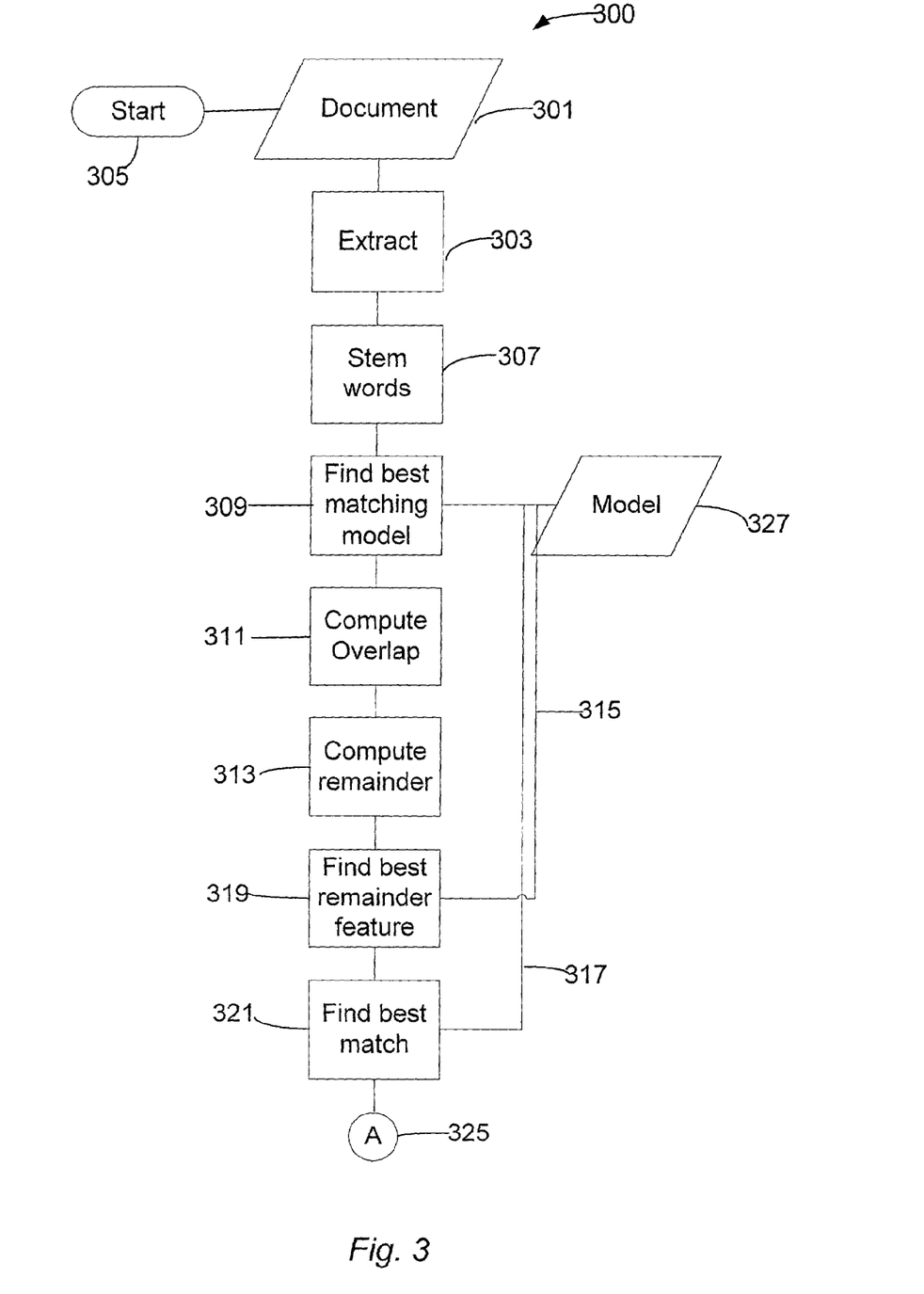
FIGS. 3 to 4 are simplified flow diagrams of an overall method according to an embodiment of the present invention

FIG. 3 is a simplified flow diagram of an overall method 300 according to an embodiment of the present invention. This diagram is merely an example which should not unduly limit the scope of the claims herein. One of ordinary skill in the art would recognize many other variations, modifications, and alternatives. As shown the method begins at start, step 305. The method includes providing a document, step 301, which is a type of item described above. As noted, the item is defined as a collection of related information such as a document, a profile (e.g., company, personal, purchase history), history information, financial information, art and literature, credit report, Web pages, technical and/or scientific papers, legal documents, patent documents (e.g., patents, patent applications).

A document is shown as follows:

Kobe, Japan was hit by an earthquake of magnitude 7.2 on the Richter scale. The quake's epicenter was 20 km beneath Awaji island and damage was severe in the nearby cities of Kobe, Ashiya and Osaka.

The document is fed into a process that includes a variety of steps. The process includes extracting words which are not stop words, step 303. The extracted words are shown as follows:

Kobe Japan hit earthquake magnitude Richter scale quake's epicenter Awaji island damage severe nearby cities Kobe Ashiya Osaka The process is performed using a combination of computer hardware and software, as noted. The process also includes a stemming words and building a feature vector, step 307. The feature vector of stemmed words is as follows:

kobe:0.125 japan:0.0625 hit:0.0625 earthquake:0.0625 magnitude:0.0625 richter:0.0625 scale:0.0625 quake:0.0625 epicentre:0.0625 awaji:0.0625 island:0.0625 damage:0.0625 severe:0.0625 city:0.0625 ashiya:0.0625 osaka:0.0625

Once the words have been extracted and stemmed, the method finds a best matching model to a feature vector. Here, the method retrieves a model from a library of models, 327. Depending upon the application, the model can include a Bayesian statistical model, or a Euclidean distance model. A sample model for the earthquake damage might be:

earthquake:0.06 richter:0.03 quake:0.03 scale:0.03 magnitude:0.02 epicenter:0.02 severe:0.01 damage:0.01 . . .

The method includes a step of computing an estimated overlap using the model, step 311. In the example, there are eight words that match between the document features and the model, leading to an overlap of $$\text{sqrt}(0.0625*0.06)+\text{sqrt}(0.0625*0.03)+\text{sqrt}(0.0625*0.03)+\text{sqrt}(0.0625*0.03)+\text{sqrt}(0.0625*0.02)+\text{sqrt}(0.0625*0.02)+\text{sqrt}(0.0625*0.01)+\text{sqrt}(0.0625*0.01)=0.3119$$

The method then computes a remainder feature vector, step 313. As shown below, the remainder vector puts less weight on those words well explained by the model, and more weight on the remaining words.

kobe:0.1704 japan:0.0852 hit:0.0852 earthquake:0.0209 magnitude:0.0421 richter:0.0335 scale:0.0335 quake:0.0335 epicentre:0.0421 awaji:0.0852 island:0.0852 damage:0.0563 severe:0.0563 city:0.0852 ashiya:0.0852 osaka:0.0852

The method then finds the best matching model to the remainder features vector, step 319. In this case, the model would be the model for Japan, which looks like japan:0.05 tokyo:0.03 honda:0.01 osaka:0.01 city:0.01 . . . kobe:0.002 island:0.002 . . .

The method (step 321) also finds the best matching combination of two models to the original vector feature.

In the example, the best match is provided by a combination of 64% earthquake and 36% Japan.

Here, the method retrieves the model from the model library, 327. As shown in step 319 retrieves the model from the library via a branch 315. As shown steps 321 retrieves the model from the library via branch 317. The method continues to connector A 325, which is shown by the diagram in FIG. 4.

Figure 4:
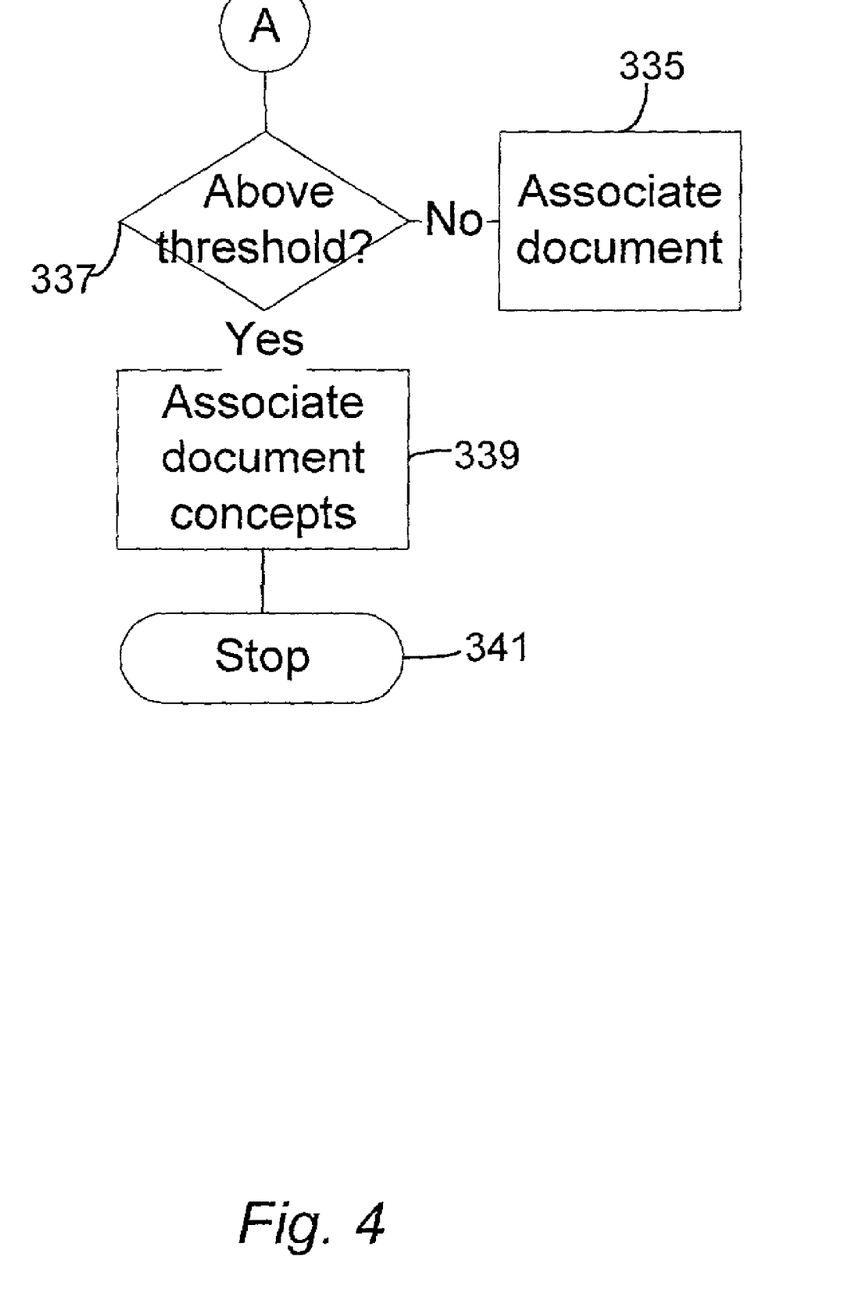

The method continues to a decision step, 337. In the decision step, the method determines if the contributions of both models are above a threshold. If the threshold has been exceeded, the method associates the document with both categories. Alternatively, if the threshold has not been exceeded, the method associates the document with the category of model making the larger contribution.

In the example, if the threshold was 25%, then document would be classified into both categories.

Depending upon the embodiment, any of the steps above can be further combined. The steps can also be further separated. Other steps can also be inserted between any of the above steps. Other steps can also be inserted within any of the above steps or step. These and other alternatives, variations, and modifications, will be recognized by one of ordinary skill in the art.

EXAMPLES

To prove the operation and implementation of the present invention, I performed experiments using computer software and hardware. In this experiment, I implemented a Euclidean distance clustering algorithm using about 40,000 documents, which were organized into about 4,000 clusters. The algorithm was implemented using an object oriented language, commonly referred to as C++. The documents were Web pages, which were captured and stored. Such Web pages were derived from the Internet. The clustering algorithm was programmed into a PC based computer having at a 600 MHz dual processors, which were based upon a microprocessor design by Intel Corporation of Santa Clara, Calif. The computer also had 256 Meg. of dynamic random access memory. The computer also required a suitable amount of memory to store the documents locally, although such documents may not need to be stored locally. Here, the computer had a 10 Gbyte storage. Each document were categorized into up to two clusters. I verified my results by way of sampling. As noted above, the present example is merely an illustration used to implement the present invention. One of ordinary skill in the would recognize many other variations, alternatives, and modifications.

In the present example, I used a clustering based on the cosine similarity metric. Other particularly useful examples would be for clustering based on Naïve Bayes, as described by Iwayama and Tokunaga. The example described is for document clustering, although the description applies equally well to classification of clustering of any kind item which can be described by a set of features, especially when there are many possible different features.

I describe how classification is done with the invention, as follows. As is common in the state of the art for document classification, the features of a document are extracted by first extracting each word occurrence in the document, ignoring common words on a stop list, and stemming the words to identify the root of the words. The document is then described by a sparse vector, with length equal to the number of unique word stems in the corpus, and with a non-zero element at those positions corresponding to the word stems that occur in the document, and with value equal to the number of occurrences of the word stem in the document. Finally, the vector is normalized, dividing each entry by the original total of all entries, so that the total of the entries in the final vector is one (1).

Given a training set of documents, with an assignment of each document to one or more categories, a model of each category is constructed, again in a fashion that is common in the state of the art. There may be a vocabulary restriction step, where the mutual information between each word stem and the categories is computed, and only those word stems with the highest mutual information are kept. Then a model for each category is constructed. The model is also a vector, specifying, for each word stem, the logarithm of the average of the feature value for that word stem across all training documents assigned to the category. A small constant value may be added to each average, before taking the logarithm, to reflect the possibility of word occurrences not in the training set, and to avoid logarithms of zero (0).

After model construction, a new document may need to be classified. First, the document feature vector is extracted, as above. Then, the dot product of that feature vector with each model is computed, as in usual Naïve Bayes classification, and the category with the highest result is chosen as the best fit. At this point, the present method is applied to find a combination of categories that fit the document.

Here, let "d" be the vector describing the features of the document, and "$d_i$" be the ith component of the vector. For easy reading, vectors have been indicated in bold and italics. Similarly, let "c" be the vector describing the average of the feature vectors of all documents in the training set of the category, and let "m" be the element wise logarithm of that vector, the Naïve Bayes model for the category. That is, $$m_i = \log(c_i);$$

where $c_i$ is the vector describing the ith component of the feature vector;

$m_i$ is the ith component of the vector of logarithms.

In these terms, the fit of the document to the model is "d·m." The example first computes:

$$a = \Sigma \text{sqrt}(d_i \cdot c_i)$$

where a is the estimate of the overlap between the category and the document.

Here, the relationship provides an estimate of the overlap between category and document. Then the method computes a preliminary remainder vector "p." The method also defines the following relationship:

$$p_i = d_i / (a + c_i / d_i)$$

where $p_i$ is the ith component of preliminary remainder feature vector;

$d_i$ is the ith component of the document feature vector;

a is the estimate of the overlap between the category and the document; and $c_i$ is the vector describing the ith component of the document feature vector.

Finally, the method computes a normalized remainder vector "r," where:

$$r = p / (\Sigma p_i).$$

The method now finds the category that best matches the remainder vector, r, that is, the category for which the dot product of r with the model for that category is highest.

The method has now identified two categories as candidates to fit the document. Let "m1" and "m2" be the models for the two categories and c1 and c2 be the element wise anti-logarithms of those categories, that is $$m1_i = \log(c1_i) \text{ and } m2_i = \log(c2_i).$$

In a specific embodiment, the method finds the mixture of the categories that best fits d. A mixture is described by mixture proportions p1 and p2, such that p1+p2=1, and where p1 reflects the contribution from the first category and p2 reflects the contribution from the second category. The mixture model is the model corresponding to the weighted sum of the category data, with weights p1 and p2. That is, if mm is the mixture model, then $mm_i = \log(c1_i p1 + c2_i p2)$.

The method performs an EM style computation to find p1 and p2 that cause mm·d to be as large as possible. It initializes p1 and p2 to be equal. That is each is set to ½. Then the method computes:

$$p1' = \Sigma d_i c1_i p1/(c1_i p1 + c2_i p2); \text{ and}$$

$$p2' = \Sigma d_i c2_i p2/(c1_i p1 + c2_i p2).$$

These become the new values of p1 and p2, and the computation is iterated. Various tests for convergence are possible, but the preferred method simply iterates ten (10) times, which gets the answer close enough to convergence, although the method can iterate more than ten times or less than ten times, depending upon the embodiment.

The final values of p1 and p2 are the estimate of the relative contribution of the two categories to the document. If both are larger than a threshold, then the document is associated with both categories, otherwise it is associated with only the category with the larger contribution. In the preferred embodiment, the threshold is ¼, but can also be set to other values.

The method described above considers only two candidate categories, but it will be evident to one skilled in the art that the process of finding candidate categories can be iterated to identify additional categories, and that the process of choosing among categories can be extended to handle several categories. The description above is expressed in terms of a classification problem, but it applies equally to the classification step of clustering, where a document needs to be associated with one or several clusters.

I now describe how the invention is used to improve model building.

The method first constructs a preliminary model for each category. For example, the preliminary model can be constructed as described above, but can be constructed using other variations. Then, the method computes a revised model, where the features of each document that assigned to multiple categories in the training set are segregated before contributing to the revised model.

The revised model is constructed as in the description above, except for documents that are assigned to more than one category. I assume, for simplicity of explanation, that such documents are assigned to only two categories, but it will be evident to one skilled in the art how to extend the explanation to documents assigned to more than two categories. Preferably, the method is limited to a number of categories that a human being can still get meaningful information. For example, the categories can be limited to 2 or less or 3 or less from more than one hundred or perhaps thousands of categories.

For each document that is assigned to two categories, the invention computes segregated document features d1 and d2. The method computes relative contributions p1 and p2 of the two categories to the document, as described above, using the preliminary models for the categories. Then the method computes preliminary segregated features, pd1 and pd2 by calculating:

$$pd1_i = d_i c1_i p1/(c1_i p1 + c2_i p2); \text{ and}$$

$$pd2_i = d_i c2_i p2/(c1_i p1 + c2_i p2) \text{ for each component of the vectors.}$$

This computation splits the document features, in accordance with the expected contributions of the categories. Finally, the method computes d1 and d2 by normalizing the preliminary segregated features, using:

$$d1 = pd1/(\Sigma pd1_i); \text{ and}$$

$$d2 = pd2/(\Sigma pd2_i).$$

Then, in computing the revised model, d1 is used in place of d when computing the revised model for the first category, and d2 is used in place of d when computing the revised model for the second category. As an option, the contributions of d1 and d2 to the averages of their model can be weighted in proportion to p1 and p2. After the revised model has been computed, it can be used as the preliminary model for another iteration. The benefit from additional iterations is, however, much less than the benefit from the initial iteration.

The method described above considers only two categories, but it will be evident to one skilled in the art that the process of segregating features can be extended to handle several categories.

The description above is expressed in terms of computing a classification model, but a very similar procedure applies to clustering. At any point in the clustering algorithm when a document is to be added to the clusters, several candidate clusters may be selected, as described above. If several clusters are selected, the document features are segregated, as described above, using the current cluster models as the preliminary models. Then the segregated document features are added to the respective clusters.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for associating an item with at least one category selected from a collection of more than one hundred categories, the method comprising:

providing a collection of more than one hundred categories, each category including a model, each model determining a process, each process determining a degree of closeness to a set of features of items;

receiving an item;

determining a set of features associated with the item;

identifying two or more categories in the collection of more than one hundred categories that relate to the set of features, the step of identifying comprising using the set of features with a process of each category in the two or more categories to determine how well the set of features matches said each category;

forming a blended model from the identified two or more categories to derive a blended process such that the blended process yields a closer fit to the set of features of the item than that of any single process of a category from the collection of categories; and associating the item to each of the two or more categories that were used to form the blended process, wherein the item becomes associated with fewer than ten of the categories.

2. The method of claim 1 wherein the item is from a plurality of documents, the set of features of the item being a set of the words or stems of words and frequency information.

3. The method of claim 1 wherein the model for each category is a Bayesian statistical model that predicts a likelihood for a feature, and wherein forming a blended model includes averaging the likelihoods each model predicts for the feature.

4. The method of claim 1 wherein identifying two or more categories further comprises:
  identifying a first category from the collection of categories whose model best matches the set of features of the item;
  determining a remainder set of features from the set of features of the item that emphasizes the reminder set of features, the remainder set of features having a characteristic that is not well explained by the model for the first category; and
  identifying a second category from the collection of categories whose model best matches the remainder set of features.

5. The method of claim 1 wherein the method is provided in a clustering algorithm, the categories being defined as clusters.

6. The method of claim 1 wherein the process of using the set of features to determine how well the set of features matches said each category is selected from a model selected from a Bayesian statistical model or a Euclidean distance model.

7. The method of claim 1 wherein the set of features includes one or more of elements including word, number, author, date of authorship, and readers.

8. The method of claim 1 wherein the item is selected from a document, a profile, a history information, art and literature, credit report, Web pages, technical and/or scientific papers, legal documents, and patent documents.

9. The method of claim 1 wherein the method is free from combinatorial explosion.

10. A method for associating an item with at least one category selected from a collection of more than one hundred categories, the method comprising:
  providing a collection of more than one hundred categories, each category including a model, each model determining a process, each process determining a degree of closeness to a set of features of items;
  receiving an item;
  determining a set of features associated with the item;
  identifying two or more categories in the collection of more than one hundred categories that relate to the set of features, the step of identifying comprising:
    identifying a first category from the collection of categories whose model best matches the set of features of the item; and
    determining a remainder set of features from the set of features of the item, the remainder set of features having a characteristic that is not well explained by the model for the first category; and
    identifying a second category from the collection of categories whose model best matches the remainder set of features;
  forming a blended model from the identified first and second categories to derive a blended process such that the blended process yields a closer fit to the set of features of the item than that of any single process of a category from the collection of categories; and
  associating the item to each of the two or more categories that were used to form the blended process, wherein the item becomes associated with fewer than ten of the categories.

11. A system for associating an item with at least one category selected from a collection of more than one hundred categories, the system having computer memory or memories that are distributed, the memory or memories comprising:
  stored data representing a collection of more than one hundred categories, the stored data for each category including a model, each model determining a process, each process determining a degree of closeness to a set of features of items;
  a first code directed to receive electronic information associated with an item;
  a second code directed to determine a set of features associated with the information from the item;
  a third code directed to identify two or more categories in the collection of more than one hundred categories that relate to the set of features, the step of identifying comprising using the set of features with a process of each category in the two or more categories to determine how well the set of features matches said each category;
  a fourth code directed to form a blended model from the identified two or more categories to derive a blended process such that the blended process yields a closer fit to the set of features of the information of the item than that of any single process of a category from the collection of categories; and
  a fifth code directed to associate the item to each of the two or more categories that were used to form the blended process, wherein the item becomes associated with fewer than ten of the categories.

12. The system of claim 11 wherein the memory or memories are provided on a client device.

13. The system of claim 11 wherein the memory or memories are coupled to a microprocessing device, the microprocessing device having at least a clock speed of about 600 MHz and greater.

14. The system of claim 11 wherein the system is substantially free from combinatorial explosion.

15. The system of claim 11 further comprising one or more codes directed to identifying a first category from the collection of categories whose model best matches the set of features of the item and to determining a remainder set of features from the set of features from the item that emphasizes the reminder set of features, the remainder set of features having a characteristic that is not well explained by the model for the first category; and one or more codes directed to identifying a second category from the collection of categories whose model best matches the remainder set of features.

16. The system of claim 11 comprises a processing device coupled to the one or more memories.

17. The system of claim 16 wherein the processing device comprises a clock speed of more than 600 MHz.

18. The system of claim 17 wherein the blended process has characteristics of processes of the identified two or more categories.

19. The system of claim 18 further comprising a sixth code directed to outputting the blended process.

20. The system of claim 17 wherein the two or more categories are less than ten categories to prevent combinatorial explosion.

* * * * *